(12) United States Patent
Cousin et al.

(10) Patent No.: US 6,354,392 B1
(45) Date of Patent: Mar. 12, 2002

(54) VEHICLE TRANSMISSION APPARATUS HAVING A VALVE FOR CONTROLLING CORNERING BEHAVIOR

(75) Inventors: Jean-Claude Cousin, Pontpoint; Louis Martin, Compiegne, both of (FR)

(73) Assignee: Poclain Hydraulics Industrie, Verberie (FR)

( * ) Notice: Subject to any disclaimer, the term of this patent is extended or adjusted under 35 U.S.C. 154(b) by 0 days.

(21) Appl. No.: 09/461,318

(22) Filed: Dec. 15, 1999

(30) Foreign Application Priority Data

Dec. 16, 1998 (FR) .............................. 98 15873

(51) Int. Cl.[7] .......................... B60K 17/356; B60K 7/00
(52) U.S. Cl. ........................................ 180/242; 180/308
(58) Field of Search .............................. 180/307, 308, 180/305, 242, 6.48

(56) References Cited

U.S. PATENT DOCUMENTS 5,682,958 A * 11/1997 Kalhorn et al. ............. 180/242
6,230,829 B1 * 5/2001 Martin et al. ............... 180/308

FOREIGN PATENT DOCUMENTS

| EP | 0547947 | 6/1993 |
| EP | 0816153 | 1/1998 |
| FR | 2719001 | 10/1995 |

\* cited by examiner

*Primary Examiner*—Brian L. Johnson
*Assistant Examiner*—Matthew Luby
(74) *Attorney, Agent, or Firm*—Ladas & Parry (57) ABSTRACT

Hydrostatic transmission apparatus for a vehicle having drivable front and rear wheels coupled to front and rear hydraulic motors. A group of motors comprises at least two motors coupled respectively to two wheels situated on either side of the vehicle. The other group of motors comprises at least one motor driving a wheel. The two motors of the first group are dual-capacity motors, each comprising a first elementary motor connected to the pump in parallel with a motor of the second group, and a second elementary motor which is connected in series with said motor of the second group. Two series pipes are thus defined. The apparatus comprises a selection valve connected to the two series pipes and to a port of the pump. This valve can take up a straight-ahead configuration in which the series pipes are isolated from the port of the pump, as well as a left-turn configuration and a right-turn configuration in which the series pipes are connected to said port. The flow sections in at least some of the path branches between the series pipes and said port of the pump are different.

15 Claims, 7 Drawing Sheets

VEHICLE TRANSMISSION APPARATUS HAVING A VALVE FOR CONTROLLING CORNERING BEHAVIOR

The present invention relates to hydrostatic transmission apparatus for a vehicle having a front group of displacement members and a rear group of displacement members, the displacement member(s) of one of said groups being steerable members.

BACKGROUND OF THE INVENTION

The apparatus comprises a transmission circuit which includes a pump, and hydraulic motors both in a front group of motors and in a rear group of motors, for driving the displacement members in the front and rear groups. A first one of the front and rear groups of motors comprises at least two motors in which two displacement members situated on either side of the vehicle are respectively coupled, while the second group of motors comprises at least one motor to which at least one displacement member is coupled, the two motors of the first group of motors being dual-capacity motors each having two distinct operating cylinder capacities which correspond respectively to a first elementary motor and to a second elementary motor, the first elementary motor of each of the dual-capacity motors being connected to the pump in parallel with a motor of the second group of motors, while the second elementary motor is connected in series with said motor of the second group, first and second series pipes thus existing between the second elementary motors of each of the two dual-capacity motors and the second group of motors.

Depending on the type of vehicle, provision may be made for the steerable displacement members, e.g. steerable wheels, to be either the rear displacement member(s) or else the front displacement member(s).

Similarly, the "first" group of motors, i.e. the group that always comprises at least two dual-capacity motors, may be the front group of motors or the rear group of motors. Depending on circumstances, the other group of motors may comprise one dual-capacity motor or two single motors, each of which drives a respective displacement member, or else two dual-capacity motors, each of which drives a respective displacement member.

Apparatus of that type is disclosed in Documents EP 0 547 947 and FR 2 719 001.

Connecting the second elementary motors in series in that way makes it possible to synchronize the wheels that are coupled to them with the wheel(s) coupled to the motors of the second group of motors. Connecting the first elementary motors in parallel in that way makes it possible to obtain torque values at the outlets of the motors that are equal.

During turning, the wheels on the outside of the turn must cover a distance longer than the distance to be covered by the inner wheels, and they must therefore be driven at a higher speed than said inner wheels. In practice, each of the wheels of the vehicle describes a curve whose radius of curvature is different from the radii of curvature of the curves described by the other wheels. For example, for a four-wheel-drive vehicle having two steerable wheels, the radius of curvature of the curve described by the steerable left wheel is different from the radius of curvature described by the non-steerable left wheel. The same applies to the right side of the vehicle.

Thus, for cornering behavior, the above-mentioned documents recommend momentarily interrupting the synchronization of the wheels by actuating valves which enable the series pipes to be connected momentarily to the pump, thereby making it possible to make the operation of the apparatus similar to that of a circuit in which all of the motors are disposed in parallel.

Unfortunately, with the apparatus of the above-mentioned documents, during turning, the two series pipes are connected via the same path to one of the ports of the pump. As a result, the pressure in both of the series pipes is substantially identical, so that the motors which are connected via those pipes all deliver substantially the same torque. Therefore, with apparatus of the above-mentioned type, when the valve for decoupling the motors during turning is activated, it is not possible to obtain a particular traction force on a given one of the wheels of the vehicle, even though it is necessary to do so. Furthermore, there is a risk of wheel spin in this situation.

Document EP 0 816 153 discloses other apparatus of the same type, in which valves make it possible to short-circuit momentarily the second elementary motors of each of the two motors of the first group of motors. When those valves are activated, only the motors disposed in parallel relative to one another remain active. That parallel configuration makes it possible, during turning, for the inner and outer wheels to be driven at different speeds. Unfortunately, it is not possible for the motors driving the inner and the outer wheels to deliver different torque values, so that it is not possible to generate different traction forces for the inner wheel and for the outer wheel.

OBJECTS AND SUMMARY OF THE INVENTION

An object of the present invention is to remedy the above-mentioned drawbacks so as to improve the behavior of the vehicle in particular during turning, by making it possible, during turning, for the inner and outer wheels to be driven at different speeds while being capable of delivering traction forces that are also different.

This object is achieved by the fact that the apparatus further comprises a selection valve connected to the first series pipe via a first connection, to the second series pipe via a second connection, and to a port of the pump via a third connection, by the fact that said valve is suitable for taking up a "straight-ahead" configuration in which all three of the above-mentioned connections are isolated from one another, a "left-turn" configuration in which the first and third connections are interconnected via a "first left branch" path, while the second and third connections are interconnected via a "second left branch" path, and a "right-turn" configuration in which the first and third connections are interconnected via a "first right branch" path, while the second and third connections are interconnected via a "second right branch" path, and by the fact that the flow sections of at least some of said right and left branches are different.

Thus, the left-turn and right-turn positions of the selection valve are specifically suited respectively for when the vehicle is turning left, and for when it is turning right. Since the flow sections in at least some of the right and left branches of the valve are different, head loss is generated in some of the branches relative to other branches, depending on the position of the valve. Such head loss means that the pressure at the downstream end of the branch is lower than the pressure at the upstream end, where upstream and downstream are considered relative to the fluid flow direction.

In particular, the flow sections in the first and second right branches are chosen to be different from each other, and the flow sections in the first and second left branches are also chosen to be different from each other. In this way, when the selection valve is in its left-turn position or in its right-turn position, the pressures in the two series pipes can be different, which makes it possible, while turning, to guarantee that the torques transferred, and thus the traction forces, are different between the various wheels of the vehicle, in particular between one or more inner wheels and one or more outer wheels.

For a vehicle of any given configuration, it is possible to define a steering diagram, i.e. to determine the curves described by each of the wheels of the vehicle in a turn of given curvature, which curves give the differences in the distances to be travelled by each of the wheels. Advantageously, the steering diagram is taken into account when determining the flow sections of the right and left branches of the selection valve.

Advantageously, the second right branch and the first left branch have substantially the same maximum flow section which is larger than the maximum flow sections of the first right branch and of the second left branch.

This constitutes a simple manner of setting the various flow sections of the selection valve for a vehicle whose behavior during right and left turns is substantially symmetrical.

Preferably, the apparatus further comprises control means for controlling the configuration of the selection valve, which means take account of the angular positions of the steerable displacement members.

The selection valve is a progressive valve, i.e. starting from its straight-ahead position, it goes progressively into one or other of its turn positions, for right turns or left turns, so as to open the right or left branches of the valves progressively.

The smaller the radius of curvature of the turn, the greater the extent to which the curves described by the outer wheels differ from the curves described by the inner wheels, so that the difference in speed necessary between the outer wheels and the inner wheels is greater.

It is thus advantageous to cause the valve to go progressively between its configurations as a function of the directions of the steerable displacement members. Generally, for a turn of very large radius of curvature, the valve can be displaced a little towards its left or right turn configuration so as to give rise to only a small difference in flow section between the first and second right or left branches. In contrast, in a turn having a small radius of curvature, the valve can be displaced to a much larger extent into its right or left turn configuration so as to give rise to a much larger difference in flow section between the first and second right or left branches.

The apparatus of the invention is applicable, for example, to a vehicle having four drivable wheels or having three drivable wheels, in which case the motor that serves to drive the isolated wheel, which is preferably the steerable wheel, is a dual-capacity motor, each of the elementary motors making up the dual-capacity motor being connected in series to the second elementary motors of respective ones of the two dual-capacity motors that drive the other two wheels.

BRIEF DESCRIPTION OF THE DRAWINGS

The invention will be well understood, and its advantages will appear more clearly on reading the following detailed description of embodiments shown by way of non-limiting example.

The description refers to the accompanying drawings, in which.

MORE DETAILED DESCRIPTION

Figure 1:
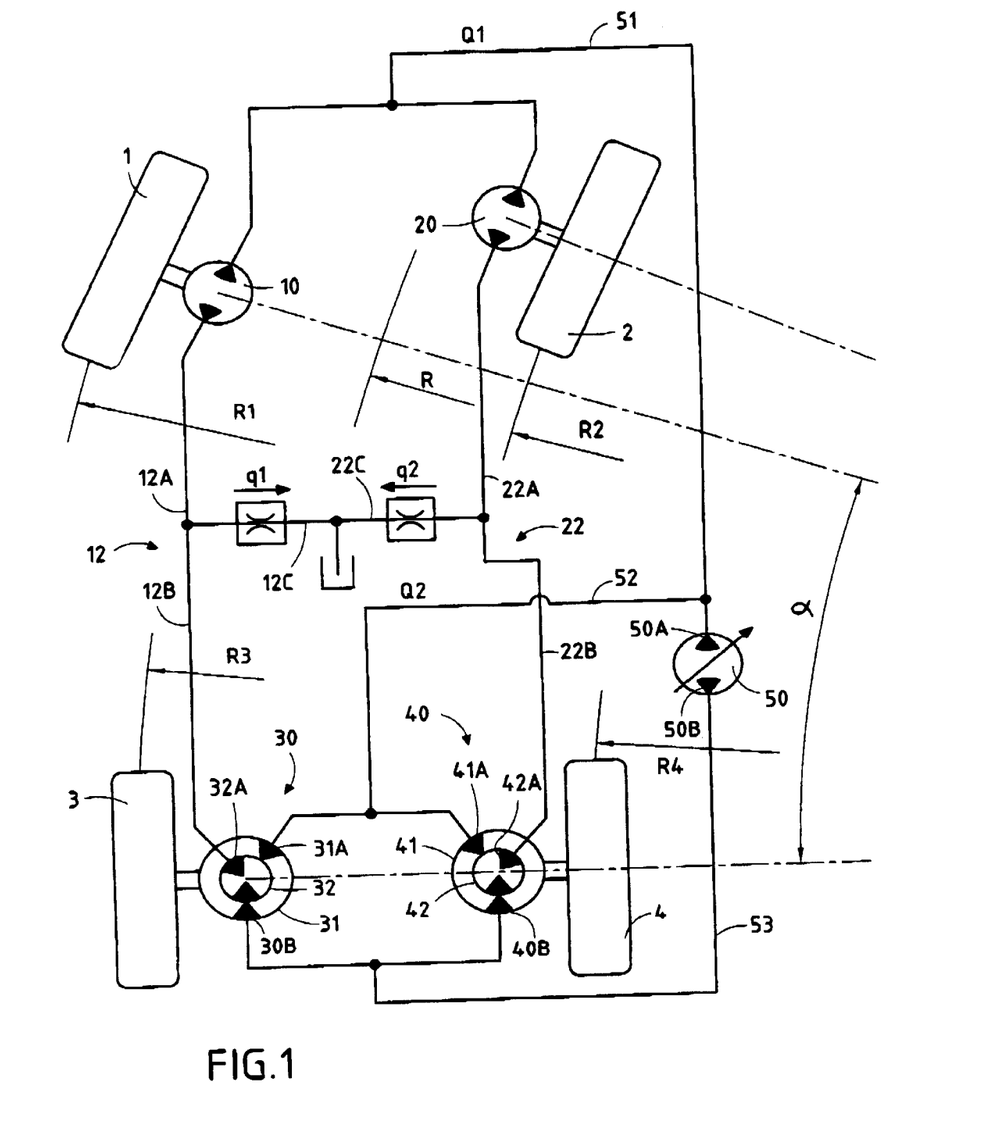
FIG. 1 diagrammatically shows the cornering behavior of a four-wheel-drive vehicle in which all four wheels are driven by respective hydraulic motors.

FIG. 1 shows the positions of the four drivable wheels 1, 2, 3, and 4 of a vehicle turning a corner whose radius of curvature is R. In the example shown, the two front wheels 1 and 2 are steerable. To start turning, the driver actuates the steering of the vehicle so as to turn the wheels 1 and 2. These wheels are thus inclined so as to be placed on the curves whose radii of curvature are respectively $R_1$ and $R_2$.

The rear wheels 3 and 4 are non-steerable. During the turning, they find themselves on the curves whose radii of curvature are respectively $R_3$ and $R_4$. It is thus possible to plot the steering diagram of the vehicle, i.e. the curves defined by the variations in the radii of curvature $R_1$ to $R_4$ as a function of the radius R, or rather as a function of the angle $\alpha$ that represents the inclination of the steerable wheel on the outside of the turn. Each of the wheels of the vehicle then has distance to cover that depends on the radius of curvature of the curve on which it finds itself.

Each of the wheels 1 to 4 is drivable and is coupled to a respective hydraulic motor 10, 20, 30, and 40. The transmission circuit is a closed circuit and includes a pump 50 having two ports, respectively 50A and 50B, and a variable flow rate. The motors 30 and 40 are dual-capacity motors, each having two operating cylinder capacities which correspond respectively to a first elementary motor, 31 for the motor 30 and 41 for the motor 40, and to a second elementary motor, respectively 32 and 42.

The motors 30 and 40 are "three-port" motors. Each of the first elementary motors 31 and 41 is provided with a main first port, respectively 31A and 41A, which serves, for example, for fluid intake purposes, while each of the second elementary motors is provided with a second port, respectively 32A and 42A, which also serves, for example, for fluid intake purposes. The third port, respectively 30B and 40B is common respectively to the elementary motors 31 and 32, and to the elementary motors 41 and 42. The third port serves, for example, for fluid discharge purposes.

In the example shown, each of the motors 10 and 20 has two ports, respectively 10A and 20A, for example for fluid intake purposes, and 10B and 20B, for example for fluid discharge purposes.

The motors may have a preferential operating direction for providing forward drive for the vehicle, but they are, in general, reversible, for reverse.

The first elementary motors 31 and 41 of the motors 30 and 40 are connected to the pump 50 in parallel with the motors 10 and 20. The first port 50A of the pump is connected to the ports 10A and 20A of the motors 10 and 20 via a pipe 51 and the end branches 51' thereof, while the first ports 31A and 41A of the elementary motors 31 and 41 are connected to the same port 50A of the pump via a pipe 52 and the end branches 52' thereof.

The second elementary motors 32 and 42 are connected in series respectively with the motors 10 and 20. Thus, the port 32A of the elementary motor 32 is connected to the second port 10B of the motor 10 via a first series pipe 12, while the port 42A of the elementary motor 42 is connected to the second port 20B of the motor 20 via a second series pipe 22.

The return to the pump 50 goes via the ports 30B and 40B of the motors 30 and 40 which are connected to the port 50B of the pump via a pipe 53. For example, the preferential operating direction of the pump is such that the motors 10 and 20 are fed before the motors 30 and 40. The pipes 51 and 52 are then pump-delivery and motor-intake pipes, while the pipe 53 is the pipe that returns to the pump. In which case, the series pumps 12 and 22 are discharge pipes for the motors 10 and 20 and intake pipes for the elementary motors 32 and 42.

The circuit further includes a booster pump 60 which, via a booster pipe 61 on which non-return valves 62 are placed, makes it possible to avoid cavitation in the hydraulic components by maintaining at least a minimum pressure or "booster pressure" in the various above-mentioned pipes.

Figure 3:
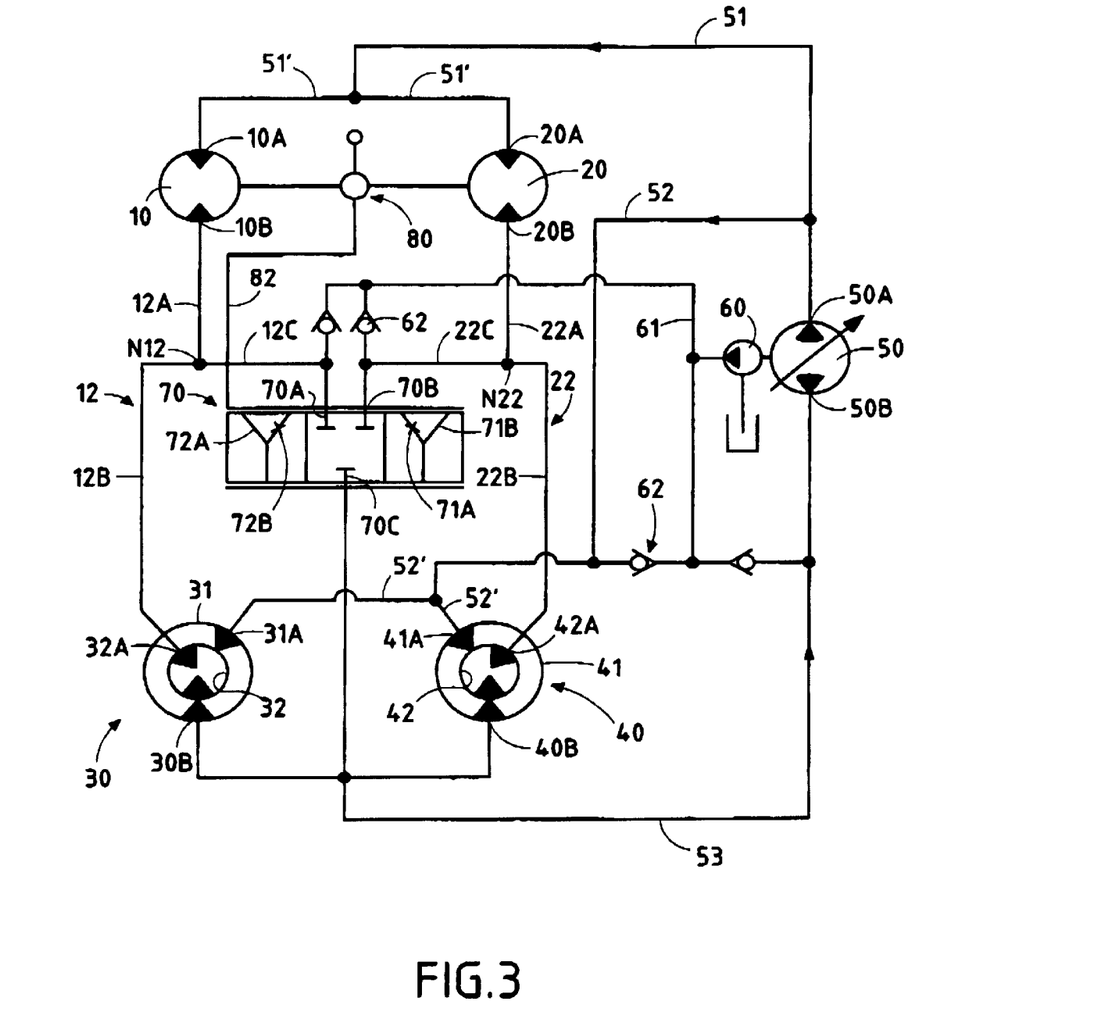
FIG. 3 shows a circuit illustrating the apparatus of the invention, for a four-wheel-drive vehicle of the type shown in FIG. 1.

In the invention, the transmission apparatus includes a selection valve 70 provided with three connections. Via its first connection 70A, it is connected to the first series pipe 12; via its second connection 70B, it is connected to the second series pipe 22; and via its third connection 70C, it is connected to the pipe 53 and, therefore, to the port 50B of the pump. The third connection 70C is connected to that one of the two ports of the pump which is not connected to the motors 10 and 20 of the second group of motors.

More precisely, the pipe 12 is made up of a first segment 12A connected to the port 10B of the motor 10, and of a second segment 12B connected to the port 32A. These two segments meet at a node N12, and thus branch off from a pipe segment 12C which is connected to the connection 70A of the valve 70. Similarly, the pipe 22 is made up of first and second segments 22A and 22B, respectively connected to the ports 20B and 42A and meeting at a node N22, at which they branch off from a pipe segment 22C which is connected to the connection 70B. The segments 12A, 12B, 12C, 22A, 22B, and 22C are also identified in FIG. 1.

By means of the above-mentioned steering diagram, it is possible to calculate the speeds at which the various wheels of the vehicle should be driven so as to be capable of covering simultaneously the various distances that they should travel. Insofar as the drive speed of each wheel is conditioned by the flow rate of fluid in the hydraulic motors to which it is coupled, it is possible to deduce therefrom a relationship between the flow rates $Q_1$ in the pipe 51 and $Q_2$ in the pipe 52 as a function of the radii $R_1$ to $R_4$.

As a result, there is a relationship between the flow rate $q_1$ in the pipe segment 12C, which flow rate depends on the flow rate $Q_1$, and the radii $R_1$, $R_2$, and $R_3$. Similarly, a relationship exists between the flow rate $q_2$ in the pipe segment 22C, and the flow rate $Q_1$, as a function of the radii $R_1$, $R_2$, and $R_4$.

These relationships are as follows:

$$q_1 = (R_1 - R_3) \cdot Q_1 / (R_1 + R_2)$$

$$q_2 = (R_2 - R_4) \cdot Q_1 / (R_1 + R_2)$$

Figure 2:
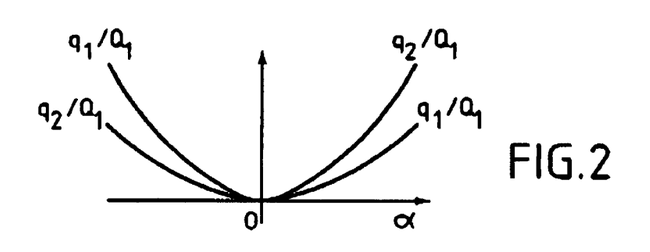
FIG. 2 shows how the flow rates of fluid in the series pipes of the transmission circuit of the vehicle shown in FIG. 1 vary as a function of the inclination of the steerable wheel that is on the outside of the turn.

FIG. 2 shows how $q_1$ and $q_2$ vary as a function of the angle $\alpha$ which represents the inclination of the steerable wheel that is on the outside of the turn. It can be observed that $q_1/Q_1$ is less than $q_2/Q_1$ when the angle $\alpha$ is positive (right turn), whereas $q_1/Q_1$ is greater than $q_2/Q_1$ when the angle $\alpha$ is negative (left turn). By means of the selection valve of the invention, by calibrating the flow sections of the right and left branches of said valve, the pressures in the series pipes are made substantially identical. For example, for a right turn, that right branch of the valve which is connected to the series pipe 12 has a flow section, for the flow rate $q_1$, that is smaller than the flow section of that right branch of the valve which is connected to the series pipe 22, for the flow rate $q_2$.

The selection valve 70 can take up three configurations. In the first configuration, shown in FIG. 3, the connections 70A, 70B, and 70C are isolated from one another. This is the configuration in which the vehicle is traveling in a straight line, with all the wheels being driven at the same speed. The second configuration of the valve is the left-turn configuration, in which the first connection 70A is connected to the connection 70C via a first left branch 71A, while the connections 70B and 70C are interconnected via a second left branch 71B. The third configuration of the valve is the right-turn configuration, in which the connections 70A and 70C are interconnected via a first right branch 72A, while the connections 70B and 70C are interconnected via a second right branch 72B.

In FIG. 3, constrictions disposed on the branches 71A and 72B are used to symbolize the fact that the flow sections in at least some of the right and left branches are different.

The flow rates $q_1$ and $q_2$ are different, so that, for example, in a left turn, the flow rates of the first and second left branches 71A and 71B are different. The flow sections in these branches may be calculated such that, with this difference in flow rate being taken into account, the pressures in the two branches are substantially identical.

In FIG. 3, the branch 71B is the branch which is connected to the motors 20 and 40 of the outer wheels in a left turn, whereas the branch 72A is the wheel that is connected to the outer motors 10 and 30 in a right turn.

The constrictions indicated on the branches 71A and 72B show that it is chosen to make the flow section larger in the branch that is connected to the motors which drive the wheels on the outside of the turn than in the other branch.

For the motors 10 and 20 that drive the two steerable front wheels, the series pipes 12 and 22 are discharge pipes when the vehicle operates in forward drive, the fluid flowing in the direction indicated in FIG. 3.

The fact that the flow section of the branch 71B is larger than the flow section of the branch 71A implies that, in a left turn, the pressure difference between the intake and the discharge of the motor 20 that drives the steerable wheel on the outside of the turn is greater than the pressure difference (discharge limited by the constriction) between the intake and the discharge of the motor 10 that drives the steerable wheel on the inside of the turn.

The situation is inverted in a right turn.

As a result, in turning, the traction force that can be delivered by the outer steerable wheel is larger than the traction force that can be delivered by the inner steerable wheel.

The travel direction indicated in FIG. 3 is the preferential direction for four-wheel-drive vehicles whose two front wheels are steerable, e.g. farm vehicles such as four-wheel grape-picking machines. However, four-wheel-drive vehicles exist in which the rear wheels are steerable, In which case, the preferential feed direction in forward drive is the opposite to the direction shown in FIG. 3. Also in this case, if it is the front wheels that are driven by the dual-capacity motors 30 and 40, it is possible to choose to reduce the section of each of the branches 71B and 72A relative to the section of each of the branches 71A and 72B, so as to obtain the same result, namely a traction force that is greater in the front wheel on the outside of the turn.

In the example shown, the motors 10 and 20 of the two steerable wheels are motors having single cylinder capacities. It is also possible to provide dual-capacity motors, of the same type as the motors 30 and 40, or of a more conventional type, having only two main ports.

Figure 4:
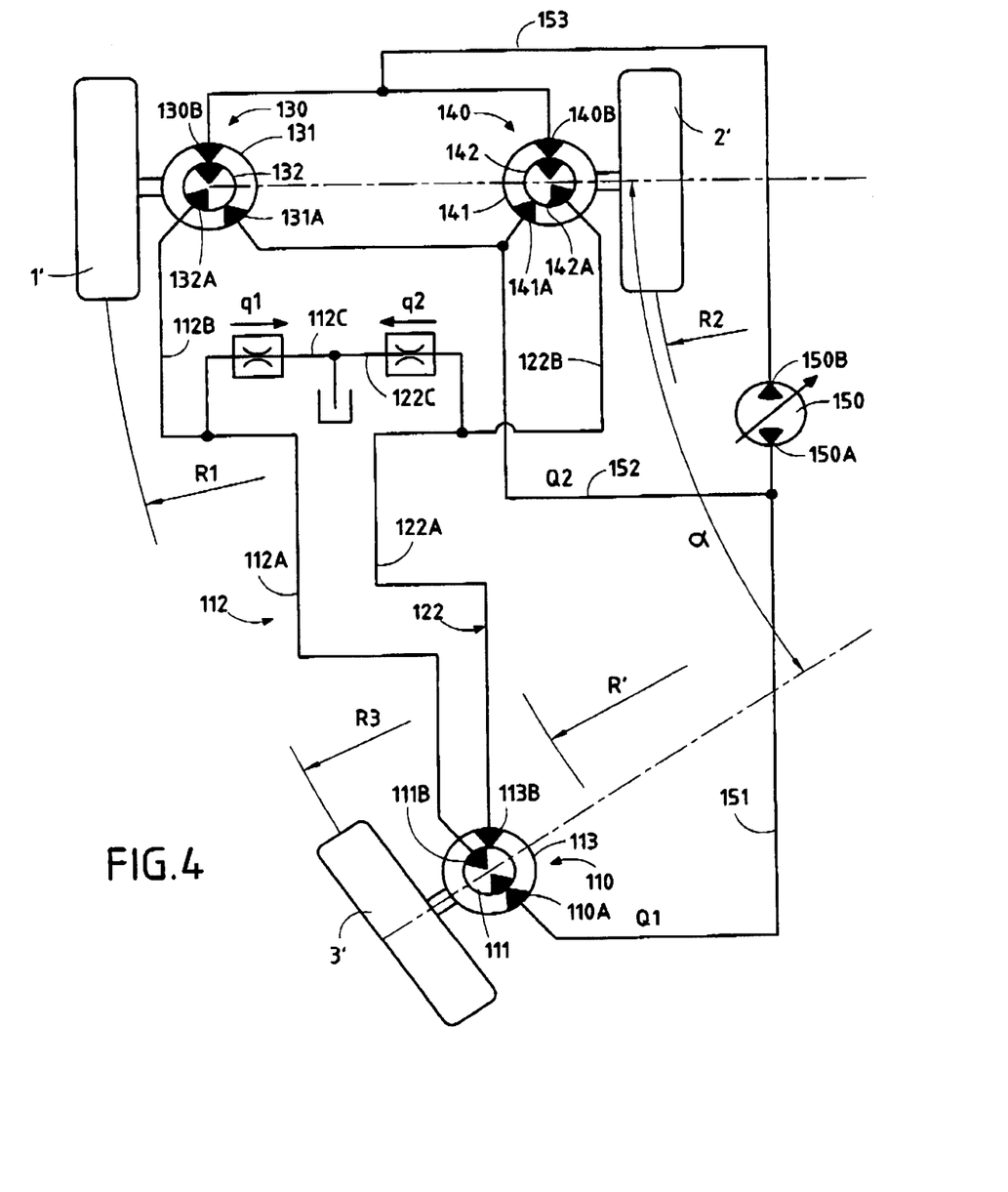
FIG. 4 is a view analogous to FIG. 1, for a three-wheeled vehicle.

FIG. 4 shows the positions of the three drivable wheels 1', 2', and 3' of a vehicle going around a turn whose radius of curvature is R'. In the example shown, the isolated rear wheel 3' is steerable. The three wheels 1', 2', and 3' of the vehicle travel over curves whose radii of curvature are respectively $R_1$, $R_2$, and $R_3$.

Figure 6:
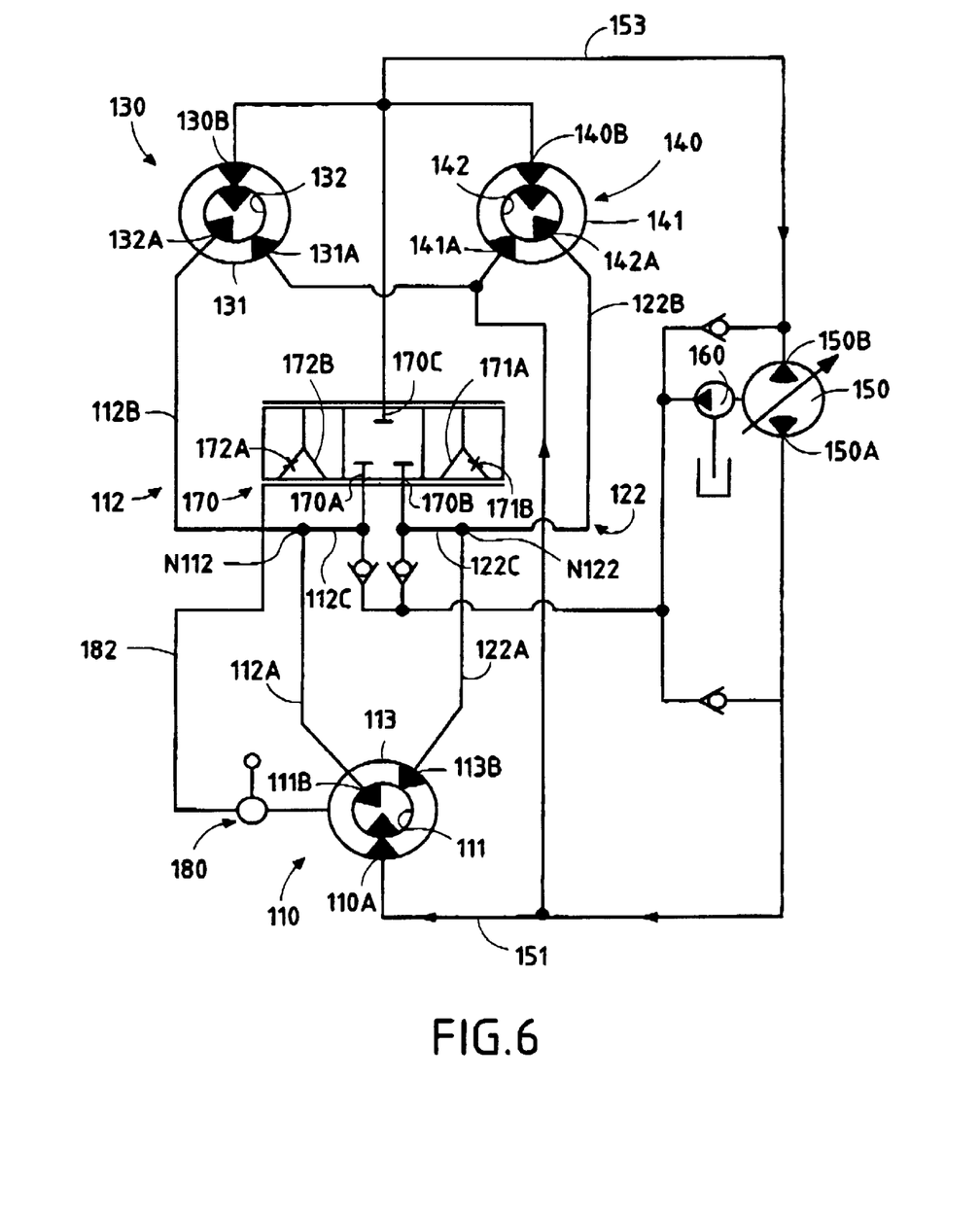
FIG. 6 shows a circuit illustrating the apparatus of the invention, as applied to a three-wheel-drive vehicle.

FIG. 6 shows, more precisely, the apparatus of the invention as applied to the transmission circuit of the three-wheeled vehicle shown in FIG. 4.

The circuit includes a pump 150 which, via a pipe 151 connected to its port 150A, feeds a motor 110 which drives the isolated wheel, which is the rear wheel and is steerable. Generally, the preferential flow direction of the fluid is the direction in which the motor that drives the isolated steerable wheel is fed first.

The motor 110 is a dual-capacity motor which includes two distinct operating cylinder capacities that correspond respectively to a first elementary motor 111 and to a second elementary motor 113. The motor is a three-port motor analogous to the motors 30 and 40 shown in FIG. 3. Thus, the port 110A which, in forward drive, is an intake port, is common to the elementary motors 111 and 113, while the fluid is discharged from these two elementary motors via ports 111B and 113B which are specific to them.

The two non-steerable front wheels of the vehicle shown in FIG. 6 are driven by two dual-capacity motors 130 and 140 analogous to the motors 30 and 40 shown in FIG. 3. It is thus possible to recognize the elementary motors 131 and 132 with their forward-drive intake ports 131A and 132A and their common discharge port 130B, and it is also possible to recognize the elementary motors 141 and 142 with their forward-drive intake ports 141A and 142A, and their common discharge port 140B.

The first elementary motors 131 and 141 are connected to the port 150A of the pump via the pipe 152, branching off from pipe 151. The second elementary motors 132 and 142 are connected respectively to the port 111B of the first elementary motor 111 of the motor 110, and to the port 113B of the second elementary motor 113 of the dual-capacity motor, via two series pipes, respectively 112 and 122. A booster pressure is maintained in the various pipes by means of a booster pump 160.

The circuit shown in FIG. 6 includes a selection valve 170 whose various connections and branches are given the same references as those of the valve 70, plus 100. The connection 170C is connected to the second port 150B of the pump 150 via the return pipe 153, to which the ports 130B and 140B of the motors 130 and 140 are also connected. Constrictions are also shown diagrammatically on the second left branch 171B and on the first right branch 172A.

The pipe 112 is made up of first and second segments 112A and 112B, respectively connected to the port 111B of the motor 110 and to the port 132A. The two segments meet at a node N112, and thus branch off from a pipe segment 112C that is connected to the connection 170A of the valve 170. Similarly, the pipe 122 is made up of first and second segments 122A and 122B respectively connected to the ports 113B and 142A, and meeting at the node N122, at which they branch off from the pipe segment 122C which is connected to the connection 170B. The segments 112A, 112B, 112C, 122A, 122B, and 122C are also identified in FIG. 4.

The flow rates $q_1$ in the first segment 112C and $q_2$ in the second segment 122C, as a function of the flow rate $Q_1$ in the intake pipe 151 of the motor of the steerable wheel, and as a function of the radii $R_1$, $R_2$, and $R_3$, are given by the following relationships:

$$q_1 = (R_3 - R_1) \cdot Q_1 / (2R_3)$$

$$q_2 = (R_3 - R_2) \cdot Q_1 / (2R_3)$$

Figure 5:
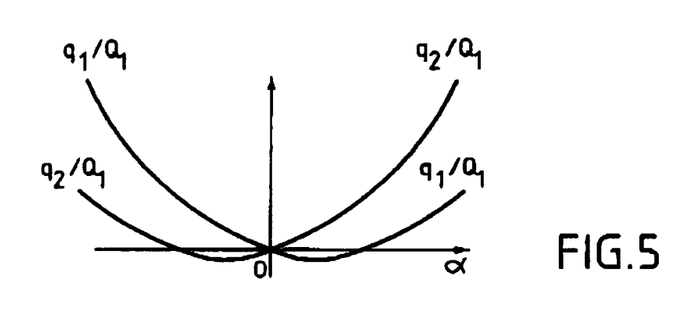
FIG. 5 is a view analogous to FIG. 2 and showing the transmission circuit of the vehicle shown in FIG. 4.

FIG. 5 shows how $q_1$ and $q_2$ vary as a function of the angle α which represents the turning inclination of the isolated steerable wheel. It can also be observed that $q_1/Q_1$ is less than $q_2/Q_1$ when the angle α is positive (right turn), whereas $q_1/Q_1$ is greater than $q_2/Q_1$ when the angle α is negative (left turn). The selection valve of the invention enables the pressures in the series pipes to be made substantially identical.

Thus, for a right turn, the first right branch 172A that is connected to the series pipe 112 which is itself connected to the motor 130 which drives the wheel on the outside of the turn has a flow section that is smaller than the flow section of the second right branch which is connected to the series pipe 122 which is connected to the motor 140 of the wheel on the inside of the turn.

Similarly, the flow section in the branch 171B ("outer" branch in a left turn) is smaller than the flow section in the branch 171A. In forward drive, the pipes 112 and 122 serve to feed the elementary motors 132 and 142. Thus, during a right turn, the pressure is greater in the pipe 112 than in the pipe 122, which means that the pressure difference between the intake terminal 132A and the discharge terminal 130B of the elementary motor 132 is greater than the pressure difference at the terminals of the elementary motor 142. The situation is the opposite during a left turn. As a result, the traction force that the front wheel on the outside of a turn can supply is greater than the traction force that the inner front wheel can supply.

In this case too, it is desirable to ensure that the front wheel on the outside of the turn supplies the higher traction force. In a three-wheeled vehicle, the isolated wheel is steerable. In vehicles such as fork-lift trucks, the isolated and steerable wheel is the rear wheel.

In a three-wheeled vehicle such as a farm tractor, the isolated and steerable wheel is generally chosen to be the front wheel. In which case, this wheel is also fed by the pump before the non-steerable wheels. The constrictions are then advantageously placed as shown in FIG. 3.

FIG. 3 diagrammatically shows a system 80 for detecting the angular positions of the steerable wheels. By means of a control line 82, this system causes the valve 70 to be displaced progressively from one or other of its configurations to another one. Similarly, the system 180 for detecting the angular position of the steerable wheel driven by the motor 110 of the circuit shown in FIG. 6 is connected via a control pipe 182 to the progressive valve 170.

Therefore, the control means for controlling the configuration of the selection valve 70 or 170 take into account the angular positions of the steerable displacement members. Thus, the selection valve includes a slide suitable for taking up three stable positions defining respectively the first, second, and third configurations of the valve, and the relationships defining the variation in the flow sections in the right and left branches of the valve while the slide is moving between these various positions are determined as a function of the steering diagram of the vehicle.

In other words, the increases and the reductions in the flow sections take into account the variations in the flow rates in the series pipes, which variations are themselves conditioned by the radii of curvature of the various curves on which the displacement members of the vehicle find themselves.

The flow section in one branch, e.g. 72A, determines the head loss on either side of the branch, i.e., for example, the pressure difference between the pipe 53 and the series pipe that communicates with said branch. Similarly, the flow section in the other branch, for example, the branch 72B, determines the head loss between the pipe 53 and the pipe 22. As a result, the ratios between the flow sections in the two right branches or in the two left branches determine the pressure difference between the two series pipes.

In an advantageous variant, it is possible to chose the relationships governing the variation of the flow sections in the various branches of the selection valve to be such that said variations as a function of the angular positions of the steerable displacement members are proportional to the variations, also as a function of the angular positions of the steerable displacement members, in the flow rates $q_1$ and $q_2$ that are necessary in the right and left branches of the valve to cause the displacement members to be displaced substantially without them spinning or slipping relative to the ground. This proportionality ratio makes it possible to ensure that the head losses are substantially equal in each of the two right branches or in each of the two left branches, so that the fluid pressures in the two series pipes 12 and 22 or 112 and 122 are substantially equal.

Figure 7A:
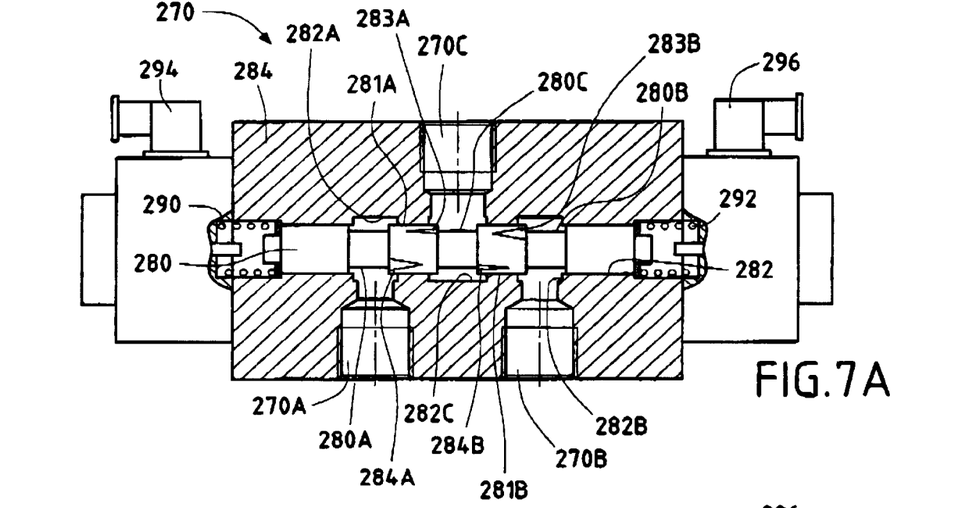
FIGS. 7A, 7B, and 7C show a selection valve in longitudinal section, in each of its three configurations.
Figure 7B:
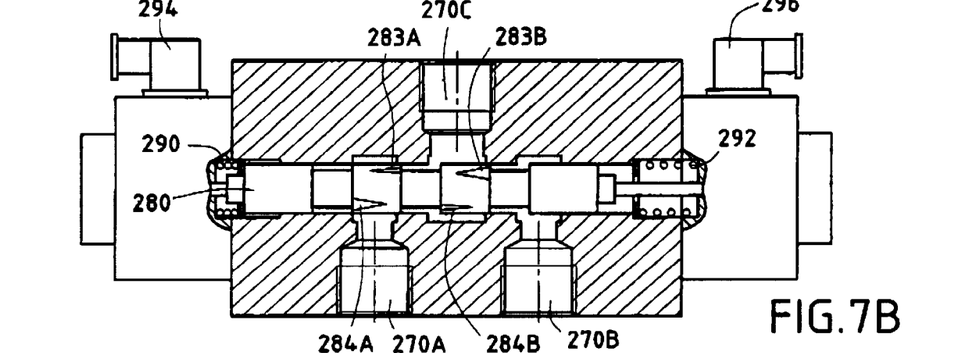
Figure 7C:
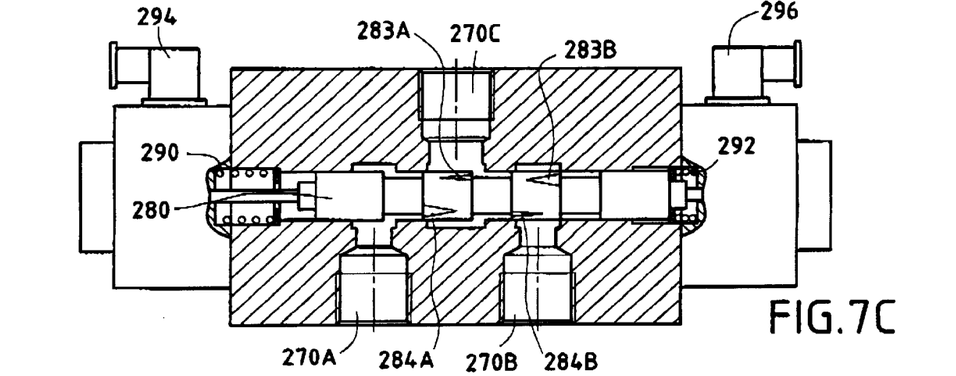

FIGS. 7A, 7B, and 7C designate a selection valve of the invention by the reference 270, it being possible for this valve to be either one of the valves 70 or 170 shown in FIGS. 3 or 6. The valve includes a slide 280 suitable for taking up three positions represented respectively in FIGS. 7A, 7B, and 7C. The slide is mounted to move in a bore 282 provided in the body 284 of the valve. The body is provided with three ports 270A, 270B, and 270C which correspond respectively to the connections 70A, 70B, and 70C or to the connections 170A, 170B, and 170C of the valves 70 or 170. These ports are connected to annular grooves, respectively 282A, 282B, and 282C, provided in the bore 282, via transverse channels. Similarly, three annular grooves, respectively 280A, 280B, and 280C are provided in the outside cylindrical surface of the slide. The groove 280C is situated between the grooves 280A and 280B, and, similarly, the groove 282C is situated between the grooves 282A and 282B.

FIG. 7A shows the straight-ahead configuration of the valve 270, and it can be seen that the grooves 282A, 282B, and 282C are isolated from one another by the intermediate portions 281A and 281B of the slide, which portions are situated between the grooves 280A and 280C, and between the grooves 280C and 280B.

The slide is held in this intermediate position by the opposing forces of two springs, respectively 290 and 292, each of which is situated at a respective one of its ends.

In FIG. 7B, the slide is displaced leftwards, and the grooves 282A and 282B communicate with the groove 282C. The intermediate portions 281A and 281B of the slide are provided with notches or with slots.

Thus, in the configuration shown in FIG. 7B, the notches 283A in the intermediate portion 281A define the flow section for the fluids between the connections 270C and 270A, while the notches 283B in the intermediate portion 281B define the flow section between the connections 270C and 270B. In the example shown, it can be seen that the notches 283B are deeper than the notches 283A, so that the pressure difference between the connection 270C and the connection 270B is smaller than the pressure difference between the connection 270C and 270A. For example, this position, in which the slide is displaced leftwards corresponds to the left-turn configuration of the valve 70 shown in FIG. 3.

In FIG. 7C, the slide is displaced rightwards, and the connections 270C and 270A communicate via the notches 284A in the intermediate portion 281A of the slide, while the connection 270C communicates with the connection 270B via the notches 284B in the intermediate portion 281B of the slide. Since the notches 284A are deeper than the notches 284B, the pressure difference is larger between the connections 270C and 270B than between the connections 270C and 270A. This position, in which the slide is displaced rightwards corresponds to the right-turn configuration of the valve 70 in FIG. 3.

By convention, the slide of the valve is chosen to be displaced leftwards for a left turn, and rightwards for a right turn. Naturally, the direction of the displacement depends on the control means used, and the constrictions in the various branches of the valve are disposed accordingly.

The valve 270 is controlled by means of two electromagnets disposed at respective ones of its ends, and the electrical controls of which can be seen respectively at 294 and at 296. The electrical controls are connected to electrical power supply lines in a manner known per se. The lines are powered as a function of the angular positions of the steerable displacement members of the vehicle on the transmission circuit of which the valve is mounted. In addition, the electrical lines may be provided with on/off switches which make it possible to control the switching on and off of the electromagnets (not shown).

Preferably, power controllers are disposed on the electrical lines so as to vary the power supply to the electromagnets progressively. This makes it possible, when the electromagnets are switched on, to displace the slide of the valve to various extents towards either one of its positions as a function of the values of the inclination of the steerable members.

Such a valve, controlled by electromagnets, is particularly suitable for the transmission circuit of a vehicle of the fork-lift truck type having three wheels.

Figure 8:
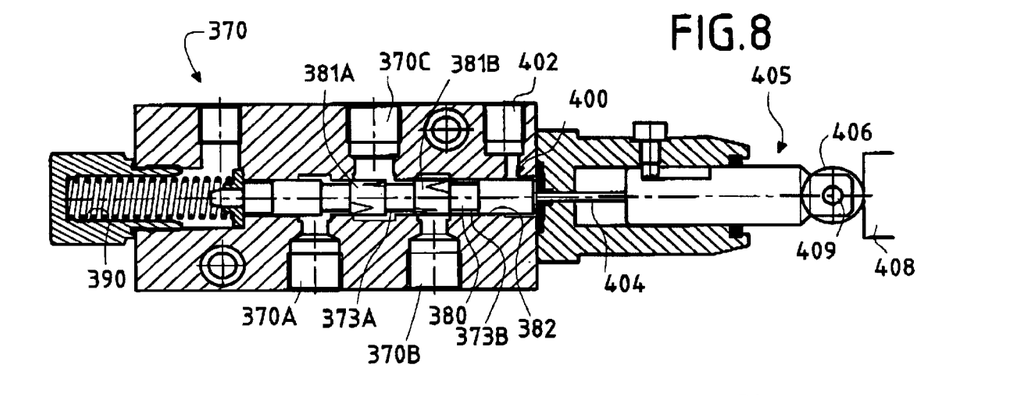
FIG. 8 is a view analogous to FIG. 7A and showing a variant of the selection valve.

FIG. 8 shows another variant of a selection valve 370. In this figure, the elements analogous to those shown in FIGS. 7A to 7C are given the same references, plus 100. The configuration of the bore 382 and the configuration of the slide 380 are substantially the same as those of the bore 282 and of the slide 280 shown in FIGS. 7A to 7C. In this variant, a control chamber 400 is provided at one end of the slide, which chamber is connected to a fluid source via a duct 402, e.g. a secondary duct connected to the booster pump for feeding the chamber and to a fluid tank for emptying it. A spring 390 is disposed at the other end of the slide, the effect of the spring opposing the effect of the pressure of the fluid contained in the chamber 400.

Unlike the valve 270, this valve 370 is controlled mechanically. Thus, at one of its ends (in this example, the end at which the chamber 400 is situated) a control rod 404 is situated, which rod is suitable for being displaced in translation by a cam system 405. FIG. 8 shows the situation in which the control rod 404 is displaced to the maximum extent rightwards, so that the spring 390 pushes the slide 380 into its extreme rightward position. The cam 406 co-operates with a roll track 408. The cam is rotated by control means 409 advantageously operated as a function of the angular positions of the steerable wheels of the vehicle.

The cam 406 is shown diagrammatically. However, it can be understood that its profile is made of three distinct portions, respectively suitable for urging the selection valve into its straight-ahead configuration, into its left-turn configuration, and into its right-turn configuration. Depending on which portion of the profile co-operates with the track 408, the rod 404 is displaced leftwards to various extents.

Figure 9:
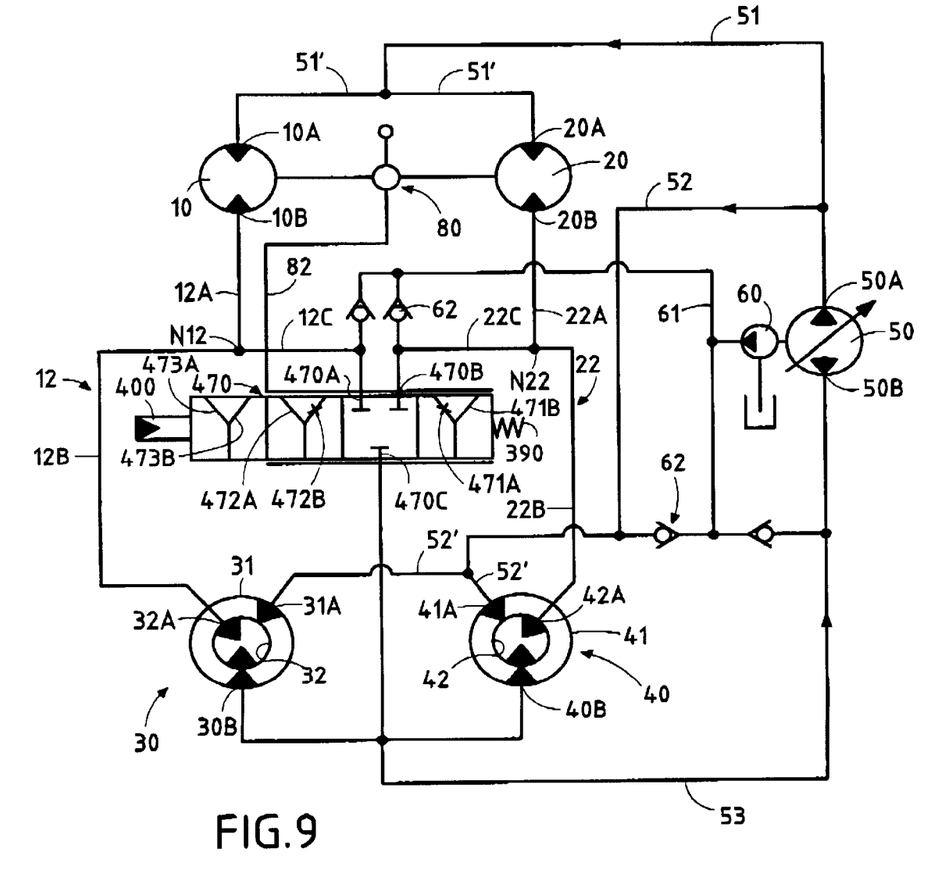
FIG. 9 shows a variant of the circuit shown in FIG. 3.

FIG. 9 shows a circuit analogous to the circuit shown in FIG. 3, but in which a valve 470 replaces the valve 70. In addition to the branches 471A, 471B, 472A, and 472B analogous to the branches in the valve 70, the valve 470 includes branches 473A and 473B that make it possible to interconnect the connections 470A, 470B, and 470C without constrictions, in a fourth configuration of the valve referred to as the "parallel feed configuration".

For example, the four-position valve 470 may be analogous to the valve 370 shown in FIG. 8, with it being possible for its slide 380 to be urged into its parallel feed position by feeding fluid into the chamber 400 against return means such as the spring 390.

When the chamber 400 is fed via the duct 402 connected to the booster, the slide 380 is displaced such as to compress the spring 390 until it comes into abutment beyond the extreme position given by the cam 406. The connections 370A, 370B, and 370C then communicate freely with one another via the smaller-diameter zones 373A and 373B of the slide 380, these zones being embodiments of the branches 473A and 474B of the valve 470.

The chamber 400 and the spring 390 form parallel feed control means which are activated by feeding the chamber 400. When the chamber is empty, they are deactivated, and the slide 380 can, once again, be caused to move between its three other positions.

In the parallel feed configuration, the motors 10 and 20 are connected to the pump 50 in a parallel connection configuration integral with the first elementary motors 31 and 41, the ports 10B and 20B being connected without constrictions to the port 50B in parallel with the ports 30B and 40B. Since the branches 473A and 473B have no constrictions, the second elementary motors 32 and 42 are short-circuited and the wheels are desynchronized.

It is also possible to provide additional valves for short-circuiting the first half-motors 31 and 41 thereby limiting the cubic capacity fed by the pump, so as to increase the speed of the vehicle.

Figure 10:
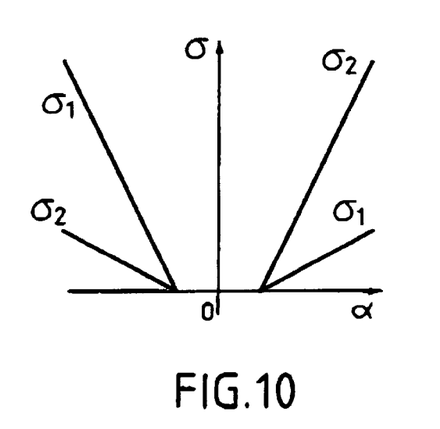
FIGS. 10 and 11 show how the flow sections of the right and left branches of the valve vary as a function of the inclination of the outer steerable wheel of the vehicle shown in FIG. 1 or of the single steerable wheel of the vehicle shown in FIG. 4.
Figure 11:
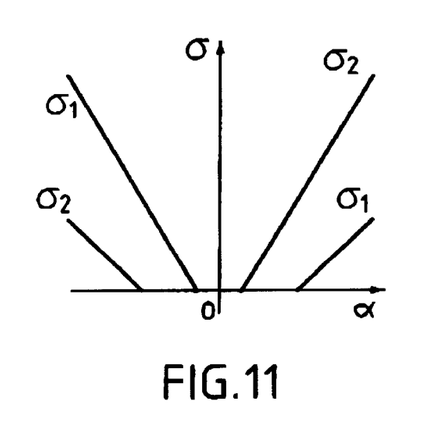

FIGS. 10 and 11 show how the flow sections in the right and left branches of the valve vary as a function of the angle α mentioned above with reference to FIGS. 1 and 2 or to FIGS. 4 and 5.

The angle α is positive in a right turn. Thus, when this angle is positive, $\sigma_1$ and $\sigma_2$ respectively represent the variation in the flow section of the first right branch 72A or 172A of the valve and the variation in the flow section of the second right branch 72B or 172B of the valve while the valve is going progressively from its straight-ahead configuration to its right-turn configuration. When the angle α is negative, the vehicle is going around a left turn, $\sigma_1$ and $\sigma_2$ respectively representing the variation in the flow section in the first left branch 71A or 171A and in the second left branch 71B or 171B while the valve is going progressively from its straight-ahead position to its left-turn position.

In order for the vehicle to have the same behavior during a left turn and during a right turn, even functions are chosen for $\sigma_1$ and $\sigma_2$. In addition, for simplification purposes, these functions are linear in the example shown.

In the embodiments shown in FIGS. 10 and 11, to take into account the flow rate ratios mentioned above with reference to FIGS. 2 and 5, provision is made for $\sigma_1$ to remain less than $\sigma_2$ so long as the angle α is positive, while $\sigma_1$ is greater than $\sigma_2$ when the angle α is negative.

In FIG. 10, this situation is obtained by means of the fact that the linear functions are such that the slope of $\sigma_1$ is less than that of $\sigma_2$ when α is positive, and vice versa when α is negative. In FIG. 11, this situation is obtained by appropriately choosing the threshold values of the angle α, beyond which values $\sigma_1$ and $\sigma_2$ take non-zero values.

As indicated above, this situation can make it possible to guarantee that the pressures in the two series pipes are substantially identical. However, it is possible to choose the variations of $\sigma_1$ and $\sigma_2$ precisely so as to guarantee determined pressure differences between the two series pipes so that a given wheel of the vehicle delivers the largest traction force, and, for example, as indicated above, the front wheel of the vehicle on the outside of the turn. Generally, the selection valve of the invention is defined so as to guarantee given pressure differences during turning, zero differences if it is desirable to obtain equal pressures in the series pipes, or non-zero differences of determined amplitude if it is desirable to obtain a traction force transfer in given proportions between given wheels of the vehicle.

What is claimed is:

1. Hydrostatic transmission apparatus for a vehicle having a front group of displacement members, and a rear group of displacements members, the displacement member(s) of one of said groups being steerable members, the apparatus comprising a transmission circuit which includes a pump, and hydraulic motors in a front group of motors and in a rear group of motors, for the displacement members in the front and rear groups, a first one of the front and rear groups of motors comprising at least two motors to which two displacement members situated on either side of the vehicle are respectively coupled, while the second group of motors comprises at least one motor to which at least one displacement member is coupled, the two motors of the first group of motors being dual-capacity motors each having two distinct operating cylinder capacities which correspond respectively to a first elementary motor and to a second elementary motor, the first elementary motor of each of the dual-capacity motors being connected to the pump in parallel with a motor of the second group of motors, while the second elementary motor is connected in series with said motor of the second group, first and second series pipes thus existing between the second elementary motors of each of the two dual-capacity motors and the second group of motors;

said apparatus further comprising a selection valve connected to the first series pipe via a first connection, to the second series pipe via a second connection, and to a port of the pump via a third connection, wherein said valve is suitable for taking up a straight-ahead configuration in which all three of the above-mentioned connections are isolated from one another, a left-turn configuration in which the first and third connections are interconnected via a first left branch path, while the second and third connections are interconnected via a second left branch path, and a right-turn configuration in which the first and third connections are interconnected via a first right branch path, while the second and third connections are interconnected via a second right branch path, and wherein the flow sections of at least some of said right and left branches are different.

2. Apparatus according to claim 1, wherein the second right branch and the first left branch have substantially the same maximum flow section which is larger than the maximum flow sections of the first right branch and of the second left branch.

3. Apparatus according to claim 1, further comprising control means for controlling the configuration of the selection valve, which means take into account the angular positions of the steerable displacement members.

4. Apparatus according to claim 1, wherein the selection valve is a progressive valve.

5. Apparatus according to claim 4, wherein the selection valve includes a slide that is suitable for taking up three stable positions respectively defining the first, second, and third configurations of said valve, and wherein the relationships governing the variation in the flow sections of the right and left branches of the selection valve while the slide is moving between its various positions are determined as a function of the steering diagram of the vehicle.

6. Apparatus according to claim 5, further comprising control means for controlling the configuration of the selection valve, which means take into account the angular positions of the steerable displacement members wherein said variations in the flow sections as a function of the angular positions of the steerable displacement members are proportional to the variations, as a function of the angular positions of the steerable displacement members, in the flow rates of the fluid which are necessary in the right and left branches of the selection valve so as to cause the displacement members to be displaced substantially without them spinning or slipping relative to the ground.

7. Apparatus according to claim 1, wherein each of the two groups of displacement members comprises two displacement members situated on either side of the vehicle, the second group of motors comprising first and second motors which are coupled to respective displacement members which are the steerable displacement members, and wherein the first series pipe connects the second elementary motor of one of the motors of the first group of motors to the first motor of the second group, while the second series pipe connects the second elementary motor of the other motor of the first group of motors to the second motor of the second group.

8. Apparatus according to claim 1, in which, when the vehicle is in forward drive, the series pipes are pipes for feeding fluid to the second elementary motors of the dual-capacity motors of the first group of motors, said dual-capacity motors driving the rear displacement members, wherein the flow sections in the right branches and in the left branches of the selection valve are determined such that, during a right or a left turn, the flow section in the right or left branch that is connected to the series pipe connected to the second elementary motor of that one of the motors of the first group which drives the displacement member on the outside of the turn is larger than the flow section in the other right or left branch.

9. Apparatus according to claim 1, wherein the second group of motors comprises a dual-capacity motor having two distinct operation cylinder capacities which correspond respectively to first and second elementary motors, a steerable single displacement member being coupled to the dual-capacity motor, and wherein the first series pipe connects the second elementary motor of one of the motors of the first group of motors to the first elementary motor of the dual-capacity motor of the second group, while the second series pipe connects the second elementary motor of the other motor of the first group of motors to the second elementary motors of said dual-capacity motor of the second group.

10. Apparatus according to claim 1, in which, when the vehicle is in forward drive, the series pipes are pipes for feeding fluid to the second elementary motors of the dual-capacity motors of the first group of motors, said dual-capacity motors driving the front displacement members, wherein the flow sections of the right branches and of the left branches of the selection valve are determined such that, during a right or a left turn, the flow section in the branch that is coupled to the series pipe connected to the second elementary motor of that one of the motors of the first group which drives the displacement member on the outside of the turn is smaller than the flow section in the other right or left branch.

11. Apparatus according to claim 1, wherein the control means for controlling the selection valve comprise two electromagnets suitable for being powered as a function of the directions of the steerable displacement members so as to cause said valve to go from its straight-ahead configuration respectively to its left-turn configuration and to its right-turn configuration, and the apparatus further comprising means for switching the electromagnets on and off.

12. Apparatus according to claim 11, further comprising means for varying the powering of the electromagnets progressively.

13. Apparatus according to claim 1, wherein the control means of the selection valve comprise a cam system whose cam profile is made up of three distinct portions suitable for causing the selection valve to go respectively to its straight-ahead configuration, to its left-turn configuration, and to its right-turn configuration.

14. Apparatus according to claim 1, wherein the selection valve is suitable for further taking up a parallel-feed configuration in which the first, second, and third connections are interconnected without constrictions, and the apparatus further comprising parallel feed control means suitable for being activated to cause the selection valve to go to its parallel feed configuration, and for being deactivated to allow the selection valve to go to another one of its configurations.

15. Apparatus according to claim 14, wherein the selection valve includes a selection slide, and wherein the parallel feed control means comprise a hydraulic control chamber suitable for being fed with fluid under pressure so as to displace the selection slide into a position defining the parallel feed configuration against the return means for returning the selection slide.

* * * * *